United States Patent [19]

Barnes

[11] 4,088,288
[45] May 9, 1978

[54] AIRCRAFT RAMP ASSEMBLY

[75] Inventor: Franklin K. Barnes, Redmond, Wash.

[73] Assignee: The Boeing Company, Seattle, Wash.

[21] Appl. No.: 791,223

[22] Filed: Apr. 27, 1977

[51] Int. Cl.² .............................................. B64C 1/22
[52] U.S. Cl. ................................. 244/137 R; 14/69.5;
160/188; 244/129.5
[58] Field of Search ............ 244/137 R, 129.5, 118 R;
14/69.5, 71.1, 71.3; 49/131, 33; 114/201 R;
214/85, 85.1; 296/57 R; 105/406 A; 160/188

[56] References Cited
U.S. PATENT DOCUMENTS

| 2,889,875 | 6/1959 | Turner et al. | 160/188 |
|---|---|---|---|
| 3,128,068 | 4/1964 | Pauli | 244/129.5 |
| 3,374,972 | 3/1968 | Webb | 244/137 R |
| 3,550,801 | 12/1970 | Larson et al. | 296/57 R X |

FOREIGN PATENT DOCUMENTS

| 1,580,050 | 5/1970 | Germany | 214/85 |
|---|---|---|---|

Primary Examiner—Barry L. Kelmachter
Attorney, Agent, or Firm—Thomas H. Murray

[57] ABSTRACT

An aircraft ramp assembly for loading and unloading of cargo includes a ramp door with a toe ramp hinged thereto. The toe ramp includes a forward toe leaf and an aft toe leaf, the forward toe leaf being coupled by a hinge along one edge to the ramp door and coupled by a hinge along the opposite edge to the aft toe leaf. An actuator supported by the ramp door moves the toe ramp from a stowed position into a position wherein at least the forward toe leaf defines an extension to the ramp door. A selectively coupled linkage including a push rod responds to movement by the forward toe leaf to position the aft toe leaf into one of three positions. In the first position, the aft toe leaf is stored in an underlying relation beneath the forward toe leaf. In the second position, the aft toe leaf engages the ramp door to form a truss support for the forward toe leaf. In the third position, the aft toe leaf forms an extension to the forward toe leaf.

6 Claims, 4 Drawing Figures

AIRCRAFT RAMP ASSEMBLY

BACKGROUND OF THE INVENTION

This invention relates to a toe ramp including forward and aft leaves adapted for use in various positions while carried by a ramp door to facilitate the loading and unloading of cargo into an aircraft; and more particularly, the present invention relates to an arrangement of parts for selectively positioning the aft leaf with respect to the forward leaf of the toe ramp into preselected positions whereby in one position the aft leaf is stowed beneath the forward leaf, in another position the aft leaf forms a truss supporting relationship with the ramp door for the forward leaf and in a third position the aft leaf forms an extension to the forward leaf.

As is known, aircraft currently in use are provided with toe ramps that are disconnected from the ramp doors of the aircraft during certain modes of cargo handling. The toe ramps are stored onboard the aircraft while loading operations are carried out with a K-type loader and during air-drop modes of operation. Large full-width toe ramps, such as provided on C-5 aircraft, require a powered and complex mechanism to disconnect and stow the toe ramp. The disconnect and stowing operations cannot be done quickly. Smaller toe ramps which are not full-width such as used on C-130 aircraft and C-141 aircraft, are disconnected and stowed manually. This is a cumbersome, time-consuming operation which usually requires the services of two men. Moreover, the smaller toe ramps must be adjusted laterally to accommodate tread widths of various different types of wheeled vehicles being loaded and unloaded.

The present invention is based on the realization that a toe ramp is necessary to provide an auxiliary bridge for certain loading and unloading modes on cargo aircraft having an aft loading ramp door. First, toe ramps are essential to passage of self-propelled, wheeled vehicles between the loading ramp and ground. Secondly, toe ramps are necessary for skidding or rolling cargo received or discharged at a fixed height, such as onto a flat-bed truck. Toe ramps are also necessary for rapid discharge of palletized cargo while the aircraft is taxiing such as during combat off-loading. While toe ramps are necessary during such loading and unloading modes, there are other instances wherein toe ramps are neither used nor needed during loading and unloading of cargo for aircraft. Toe ramps are not employed or needed for skidding or rolling cargo from adjustable-height vehicles, such as a military K-type loader and forklifts. Moreover, toe ramps are neither required nor needed for airdrop palletized cargo. In these instances, the toe ramp must be positioned or stowed in a manner so as to avoid creating obstacles that impede the efficient handling of cargo.

In addition to the foregoing, there are other important objectives by the military dealing with the design of a toe ramp. The toe ramp must be positioned by a single operator. The toe ramp must form a ground-to-ramp angle of 13° or less. The toe ramp must be compatible with tread widths of all loadable vehicles and adapted for rapid conversion from an air-drop mode of operation to airland missions.

SUMMARY OF THE INVENTION

It is an object of the present invention to provide an improved toe ramp for cargo aircraft wherein the ramp is an integral part of the loading ramp door for all modes of operation, whereby the ramp remains attached to the door.

It is still another object of the present invention to provide a ramp loading door with a toe ramp attached thereto by a simple hinge-pin arrangement while adapted for use in various different modes of operation.

It is another object of the present invention to provide for cargo aircraft including an aft loading ramp door, a toe ramp which a single operator controls by a powered actuator to permit use of the toe ramp in any one of a plurality of different modes of use.

In accordance with the present invention, there is provided an aircraft ramp assembly to facilitate loading and unloading of cargo, the ramp assembly including the combination of a ramp door, a toe ramp including a forward toe leaf and an aft toe leaf, the forward toe leaf being coupled by a hinge means along one edge of the ramp door and coupled by hinge means along the opposite edge to the aft toe leaf, actuator means operatively connected to the ramp door and forward toe leaf to move the toe ramp from a stowed position into a position wherein at least the forward toe leaf defines an extension to the ramp door, and linkage means coupled between the ramp door and the aft toe leaf to selectively position the aft toe leaf into predetermined positions including a stowed position underlying the forward toe leaf and a position forming a ramp extension of the forward toe leaf.

In the preferred form of the present invention, the aft toe leaf is constructed and positioned by the linkage means so that the aft toe leaf forms a support brace for the forward toe leaf. The arrangement of parts is such that the linkage means positions the aft toe leaf for engagement with the ramp door so as to form a truss support for the forward toe leaf. The linkage means includes a rack rod coupled by a pinion gear to the aft toe leaf to rotate the latter about an axis coinciding with the pivot axis of the hinge pin. The displacement of the rack rod is controlled by selecting one of a plurality of attachment points at which the free end of the rack rod is connected. One attachment point coincides with the pivot axis of the hinge pin used to join together the ramp door and the forward toe leaf. Two additional attachment points are spaced at different distances forwardly from the hinge pin whereby these points determine the extent of displacement to the rack rod and thereby the pivotal movement of the aft toe leaf with respect to the forward toe leaf. When the rack rod is coupled at the attachment point coinciding with the hinge pin, there is no displacement to the rack rod whereby the aft toe leaf remains in a stowed position underlying the forward toe leaf. Although not mandatory, the present invention enables the employment of a full-width toe ramp to accommodate all vehicle tread widths as well as off-center loading.

These features and advantages of the present invention as well as others will be more fully understood when the following description is read in light of the accompanying drawings, in which.

Figure 1:
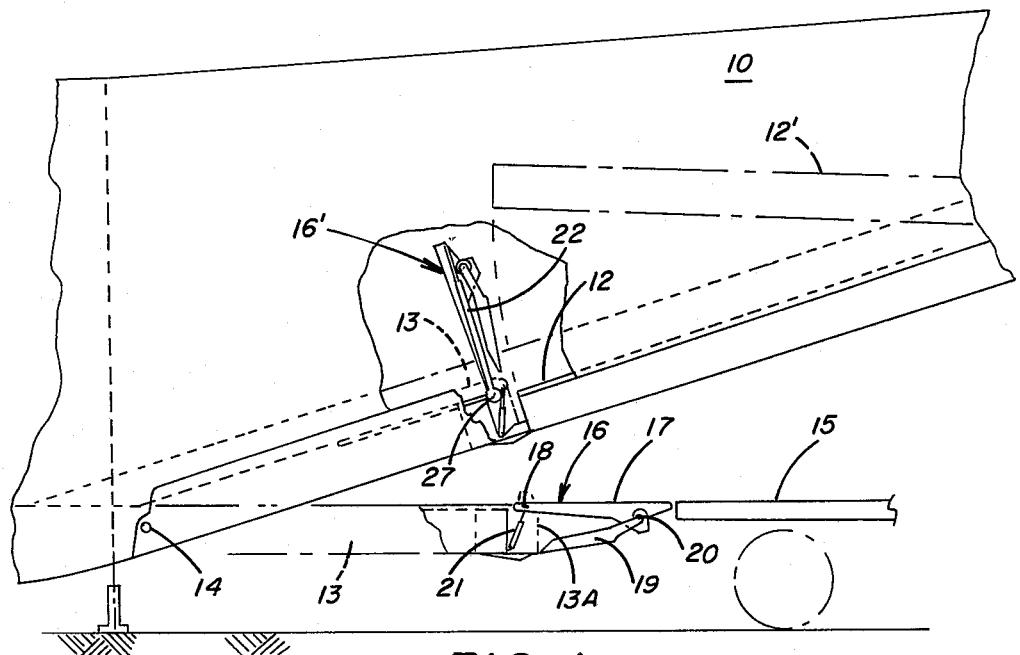
FIG. 1 is a side elevational view of a cargo ramp including a toe ramp wherein the parts are arranged for loading of cargo from a flat-bed truck.

FIG. 1 illustrates the general arrangement of parts forming a ramp used to support cargo loads during movement into and out of an airplane fuselage through a bottom opening located at a substantial distance above the ground. The airplane fuselage 10 is diagrammatically illustrated and includes an opening 11 located in the aft portion of the fuselage toward the tail. The opening 11 is closed through the cooperative relation between a cargo door 12 and a ramp door 13. The cargo door 12 is positioned into a phantom-line position 12' within the fuselage to provide sufficient space for the passage of cargo to and from the fuselage. The forward end of the ramp door 13 is attached to the fuselage by a hinge pin 14 by which the ramp door pivots in response to a cable or hydraulic actuator to a position outwardly of the fuselage. In one aspect of the present invention, the ramp door is lowered into a position which is adjustable so as to correspond to the height of a support surface of a cargo-carrying vehicle. Such a vehicle is generally indicated by reference numeral 15 typically in the form of a flat-bed truck. The truck is positioned so that an air gap exists between the support surface of the truck and a toe ramp assembly 16.

In accordance with the present invention, the toe ramp assembly 16 includes a forward toe leaf 17 that is hinged to the ramp door 13 by a hinge pin 18 along the forwardly-disposed edge of the leaf. The forward toe leaf 17 is preferably a full-width extension to the ramp door 13. The toe ramp assembly 16 further includes an aft toe leaf 19 that is hinged by a hinge pin 20 to the forward toe leaf 17. In FIG. 1, the toe ramp assembly 16 is positioned by an actuator 21 from a stowed position 16' wherein it extends in a generally perpendicular relation to the support surface of the ramp door 13 into the fuselage of the aircraft. Typically, the actuator 21 takes the form of a piston and cylinder assembly that is supported by the ramp door and connected at its rod end to the forward toe leaf 17.

Figure 2A:
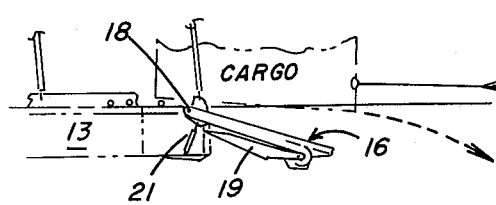
FIG. 2A is a view similar to FIG. 2 but illustrating an air-drop position of the cargo ramp.
Figure 2:
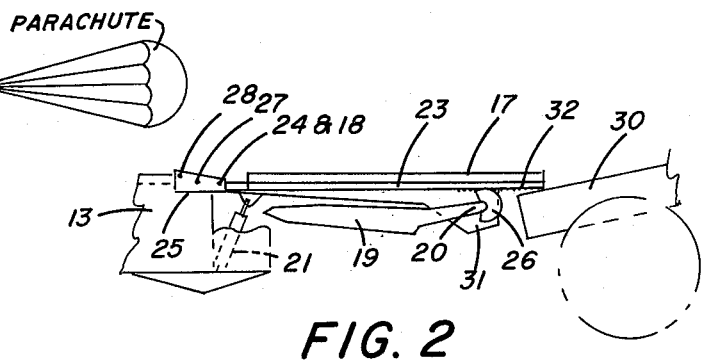
FIG. 2 is a partial view similar to FIG. 1 but illustrating a different arrangement of parts wherein the toe leaf is supported upon the bed of a vehicle for cargo.
Figure 3:
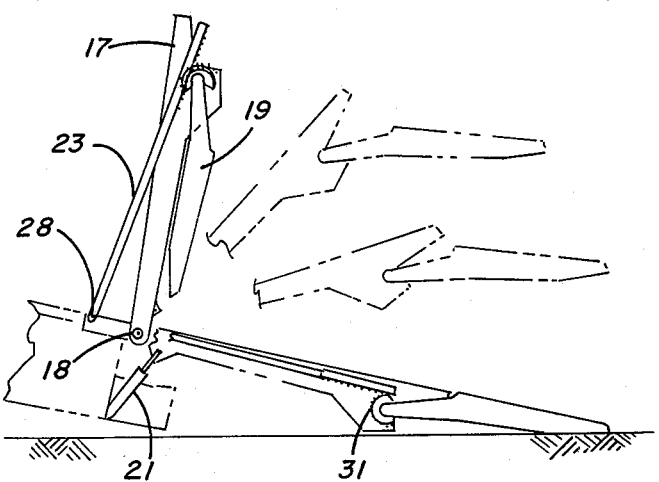
FIG. 3 is a view similar to FIG. 2 but illustrating the parts arranged for gound loading of cargo.

After the aft cargo door 12 is raised and the ramp door 13 is lowered, the actuator 21 is energized to pivotally displace the toe ramp assembly 16 about hinge pin 18. In this way, the forward toe leaf is rotated about the hinge pin to form an extension to the support surface of the ramp door. Concurrently, the aft toe leaf 19 is moved from a stowed position wherein it underlies the forward toe leaf to a position where the extended, free end of the aft toe leaf engages the aft surface 13A of the ramp door 13. In this position, the aft toe leaf forms a truss support for the forward toe leaf to provide a rigid ramp extension to the ramp door. The movement of the aft toe leaf is accomplished, according to the present invention, by slaving the motion of the actuator 21 by a mechanical linkage 22. As best shown in FIGS. 2 and 3, the linkage includes a push rod 23 attached at one end by a pivot pin 24 which is supported by a clevis plate 25 secured to the ramp door. The free end of the push rod 23 includes rack teeth that mesh with a pinion gear 26 keyed or otherwise secured to the aft toe leaf in a coaxial relation with the hinge pin 20. The clevis plate 25 supports, in addition to pivot pin 24, two additional pivot pins 27 and 28. Pivot pins 27 and 28 are strategically located to produce the desired magnitude of movement to the push rod and thereby the desired rotational positioning of the aft toe leaf in response to operation of actuator 21. Pivot pin 24 is aft of pivot pins 27 and 28, the former being located in a coaxial relation with the hinge pin 18 forming the pivotal interconnection between the forward toe leaf and the cargo door. Pivot pin 28 is spaced forwardly of pivot pin 27.

FIG. 2 illustrates a second mode of use for the toe ramp assembly according to the present invention wherein the aft end of the forward toe leaf is adapted for support upon a cargo-loading vehicle 30 having a fixed height. In this regard, the undersurface of the forward toe leaf along the aft end thereof is flat because the hinge pin 20 is actually spaced forwardly of the aft edge. It will be observed that the hinge pin 20 is carried by ground support pads 31 that project from the undersurface of the forward toe leaf. The pads form protrusions from the bottom surface of the forward toe leaf that define a pocket-like recess 32 between the pads and the terminal aft edge of toe leaf 17. The toe ramp assembly 16, when positioned as shown in FIG. 2, is adapted for other modes of cargo handling in addition to that already described in regard to support upon the surface of a fixed-height loading vehicle. The pocket-like recess 32 forms a stow space, as shown in FIG. 2A, for a cargo extraction parachute P in an air-drop mode of cargo delivery. In this move, the toe ramp assembly 16 is moved to a position significantly below the coplanar position of the ramp door 13. In such a position, no contact is made between the rapidly moving cargo and the toe ramp during the cargo extraction process. In either mode of cargo handling according to the arrangement of the toe ramp assembly shown in FIG. 2, the aft toe leaf 19 is tucked under the forward toe leaf. This arrangement of parts is brought about by positioning the push rod so that the forward end thereof is attached to pivot pin 24 which is coaxially arranged with respect to the hinge pin 18. Thus, in this mode of operation when the actuator 21 is energized, the push rod remains stationary with respect to longitudinal movement whereby the aft toe leaf remains in its stowed position at the underside of the forward toe leaf.

In a further mode of operation, as illustrated in FIG. 3, the forward end of push rod 23 is attached at pivot pin 28 which is the most remote pivot point with respect to hinge pin 18. By this relationship of parts, there is the greatest degree of longitudinal movement by the push rod 23. With the toe ramp assembly in a stored position 16', i.e., the forward toe leaf extending perpendicular with respect to the ramp door, the forward location of pivot pin 28 with respect to hinge pin 18, produces the greatest longitudinal displacement of the push rod whereby the rack teeth at the end of the push rod rotate pinion gear 26 and thereby the aft toe leaf into an extended in-like position with respect to the forward toe leaf. This arrangement of parts is used for ground loading of cargo. As can be seen in FIG. 3, the support pads 31 of the forward toe leaf engage the ground surface as does the undersurface of the aft toe leaf.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An aircraft ramp assembly to facilitate loading and unloading of cargo, said ramp assembly including the combination of:

a ramp door, a toe ramp including a forward toe leaf and an aft toe leaf, the forward toe leaf being coupled by hinge means along one edge of said ramp door and coupled by hinge means along the opposite edge to said aft toe leaf, actuator means operatively connected to said ramp door and said forward toe leaf to move said toe ramp from a stowed position into a position wherein at least said forward toe leaf defines an extension to said ramp door, and linkage means coupled between said ramp door and said aft toe leaf to selectively position the aft toe leaf into a predetermined position including a stowed position underlying the forward toe leaf, a position contacting said ramp door to form a support for said forward toe leaf, and a position forming a ramp extension of the forward toe leaf.

2. The ramp assembly according to claim 1 wherein said linkage means includes a rack rod coupled by a pinion gear to said aft toe leaf.

3. The ramp assembly according to claim 2 wherein said linkage means further includes a clevis plate having a plurality of pivot shafts each adapted for coupling to said rack rod.

4. The ramp assembly according to claim 3 wherein said clevis plate supports three spaced-apart pivot shafts with one of said pivot shafts coextending with the axis of hinged movement by said forward toe leaf with respect to said ramp door.

5. The ramp assembly according to claim 1 wherein said linkage means includes at least three pivot shafts supported in a parallel, spaced-apart relation by said ramp door, one of said pivot shafts being arranged coaxial with the axis of hinged movement by said forward toe leaf with respect to said ramp door, and an actuator rod coupled at one end to said aft toe leaf and coupled at the other end to one of said plurality of pivot shafts.

6. The ramp assembly according to claim 1 wherein said forward toe ramp includes support pads projecting at a spaced location from the aft end of the forward toe ramp for supporting engagement with the ground.

* * * * *